United States Patent [19]

Kinoshita et al.

[11] 4,234,921
[45] Nov. 18, 1980

[54] TESTER FOR ELECTRONIC ENGINE CONTROL SYSTEMS

[75] Inventors: Tsuneo Kinoshita, Kokubunji; Kazuyuki Sato, Koganei; Ryusuke Soneoka, Kunitachi, all of Japan

[73] Assignee: Tokyo Shibaura Denki Kabushiki Kaisha, Japan

[21] Appl. No.: 919,494

[22] Filed: Jun. 27, 1978

[30] Foreign Application Priority Data

Jun. 27, 1977 [JP] Japan .................. 52-76381

[51] Int. Cl.² ........................................... G01M 15/00
[52] U.S. Cl. ..................................... 364/424; 73/116;
364/551; 364/900
[58] Field of Search ............. 364/551, 424, 425, 431,
364/442, 200 MS File, 900 MS File; 73/117.2,
112, 116, 117.3; 324/16 R, 15; 123/32 EA;
340/22, 52 R, 53, 74

[56] References Cited

U.S. PATENT DOCUMENTS

| 3,485,093 | 12/1969 | Muller et al. | 73/116 |
| 3,919,466 | 11/1975 | Huwyler et al. | 73/116 |
| 3,972,230 | 8/1976 | Hanson et al. | 73/116 |
| 4,125,894 | 11/1978 | Cashel et al. | 364/442 |

OTHER PUBLICATIONS

"The Use of Microprocessors as Automobile On-Board Controllers", 1974, IEEE Intercon Technical Papers, 1974.

Primary Examiner—Errol A. Krass
Attorney, Agent, or Firm—Finnegan, Henderson, Farabow, Garrett & Dunner

[57] ABSTRACT

A tester for an electronic engine control system is provided with an output circuit through which test signals are delivered to the electronic engine control system. The electronic engine control system responds to the test signals to deliver response signals to the tester. The response signals outputted are sent through an input circuit to a judgement circuit where the response signals are operated upon, compared and judged to check to see whether operation of the engine control system is proper or not. The result of the checking is displayed by a display circuit.

26 Claims, 33 Drawing Figures

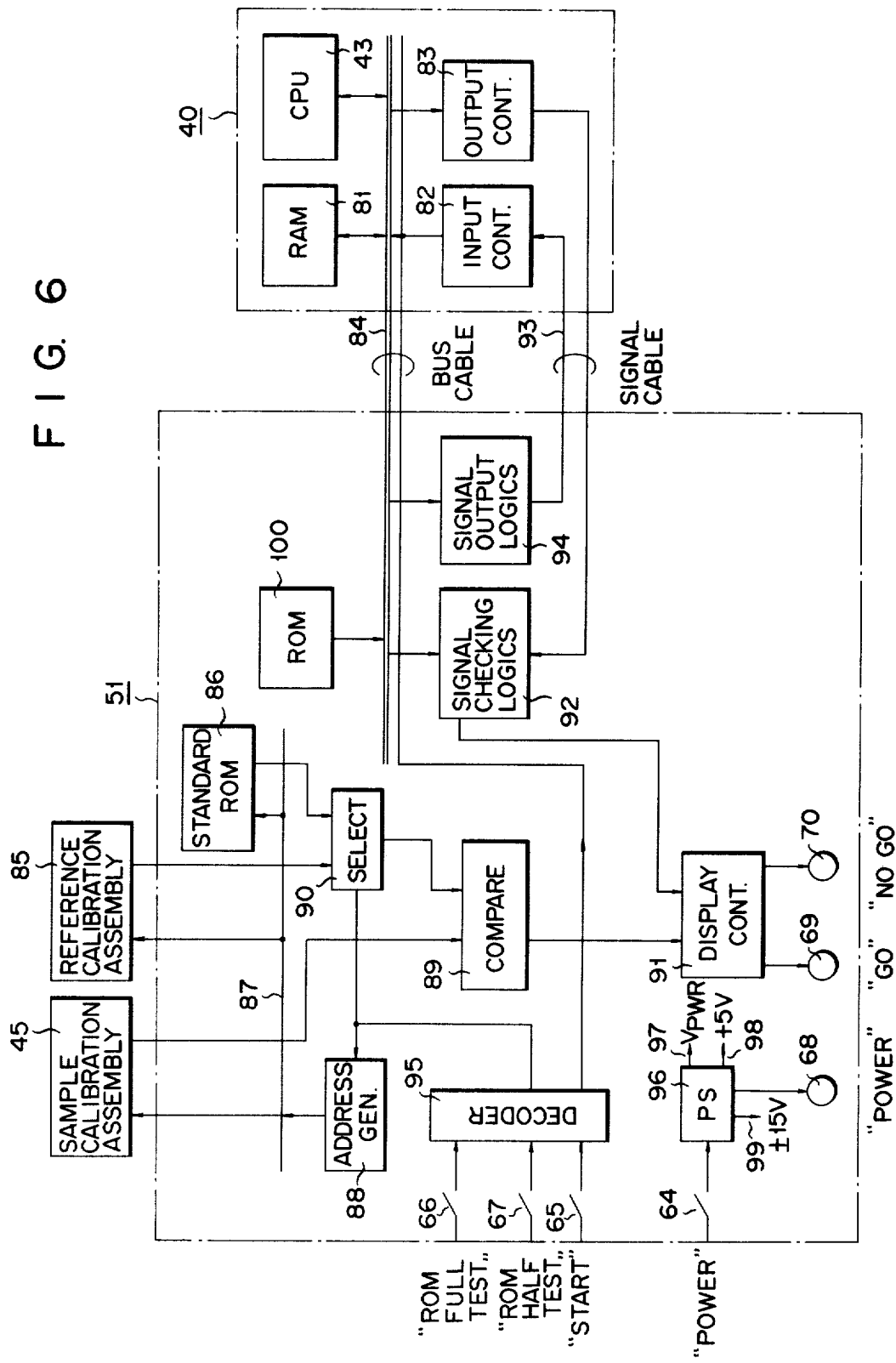

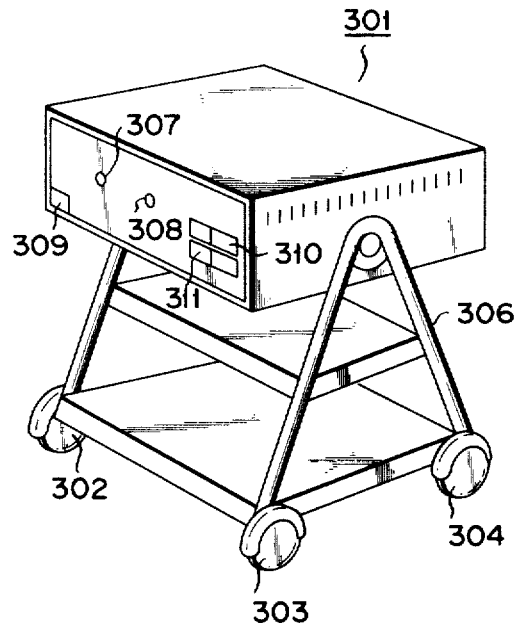
F I G. 11
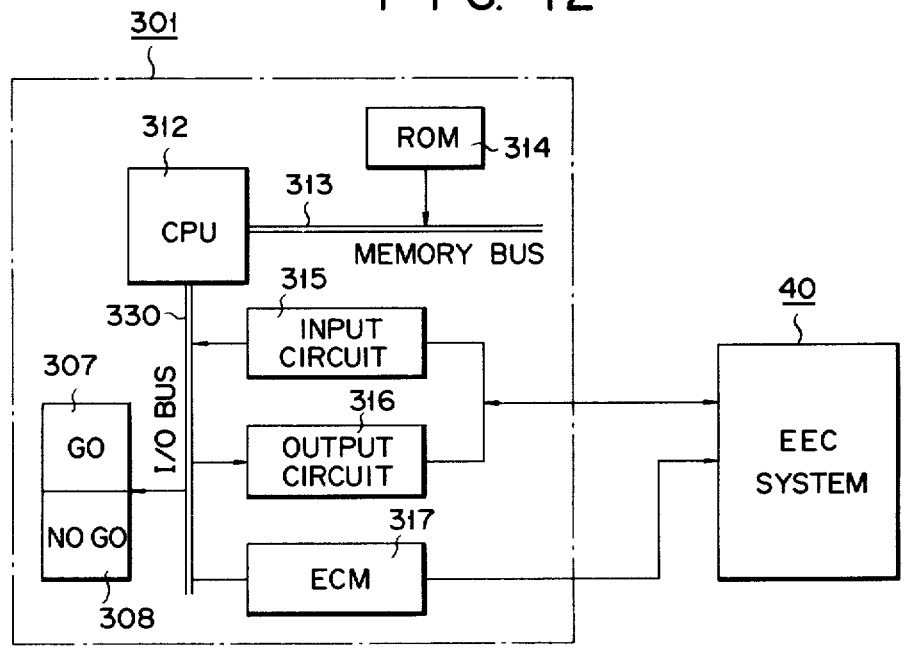
F I G. 12

F I G. 16
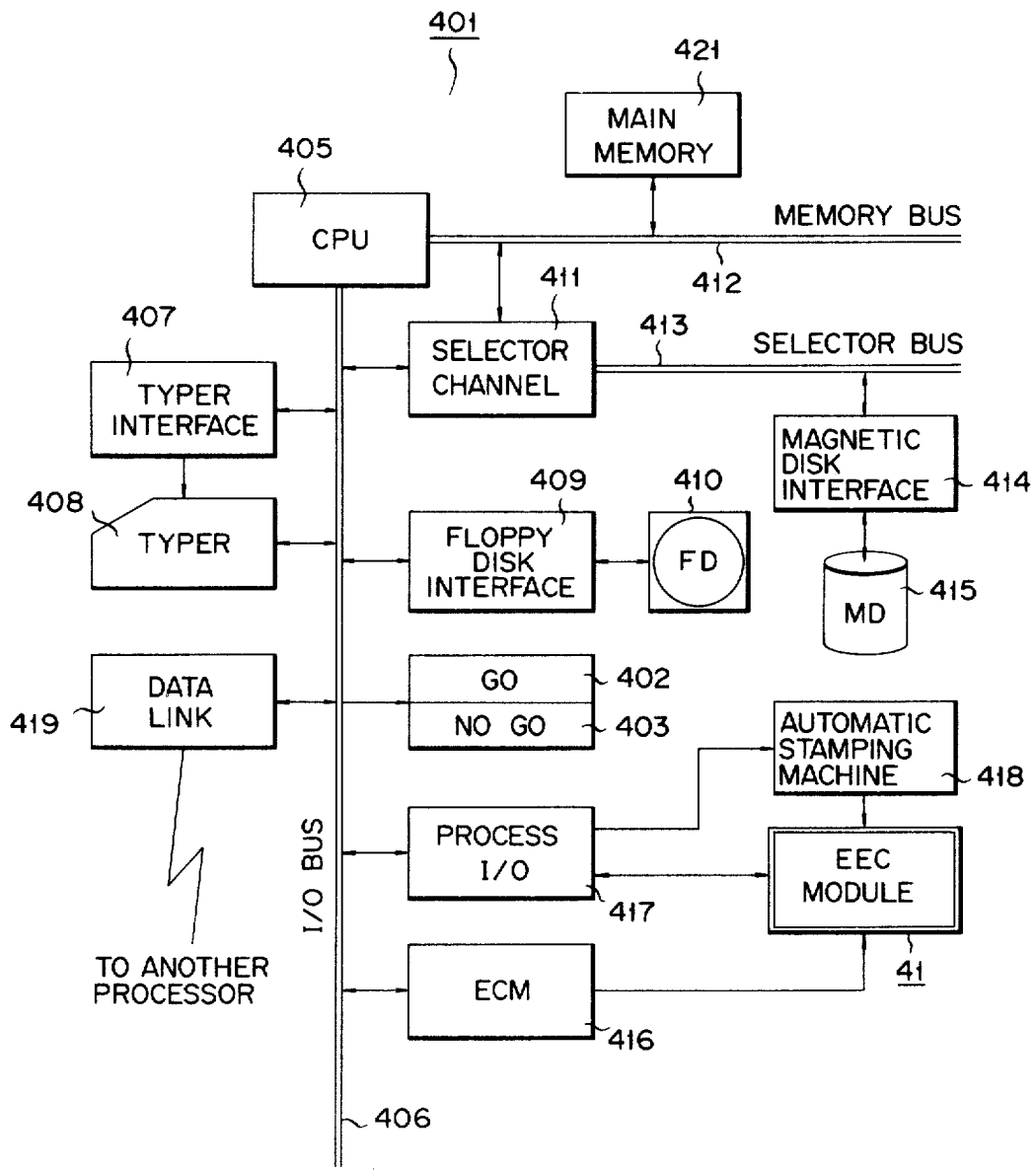

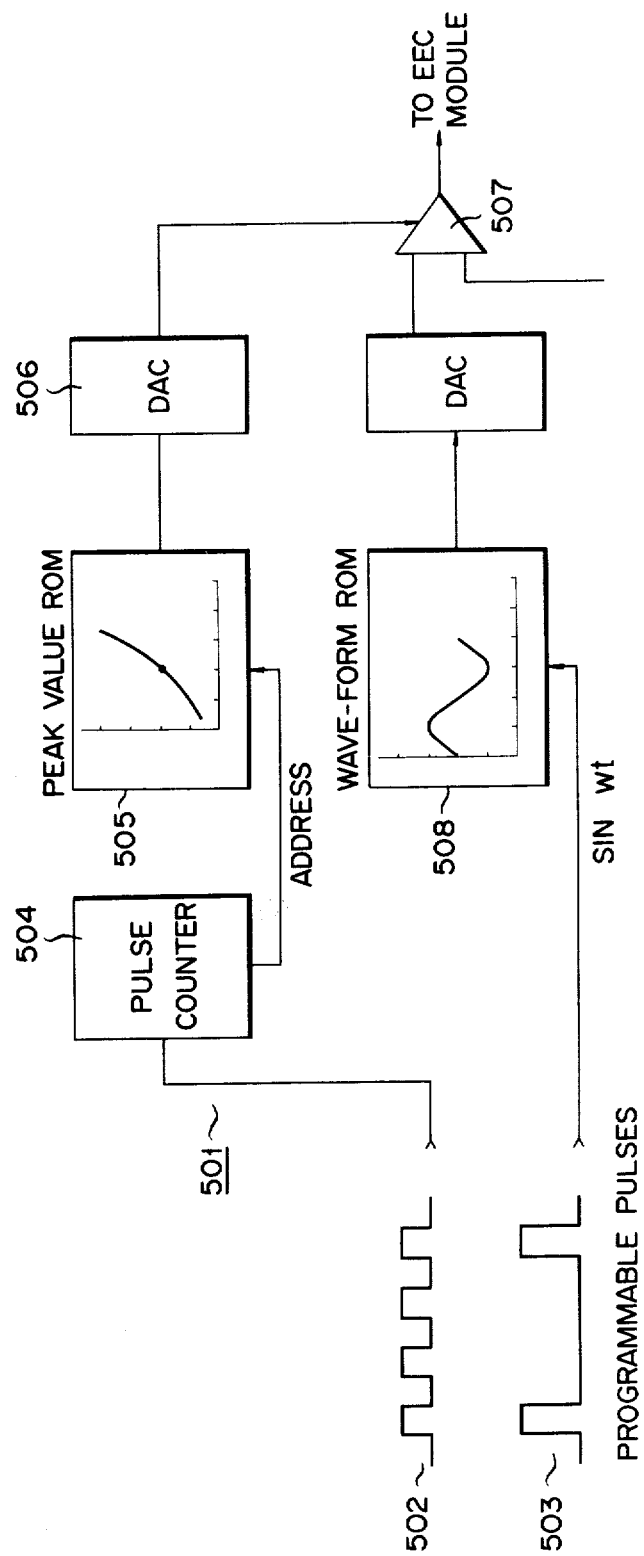

TESTER FOR ELECTRONIC ENGINE CONTROL SYSTEMS

BACKGROUND OF THE INVENTION

1. Field of the Invention

The invention relates to a tester for an electronic engine control system to check an electronic engine control system mounted on a vehicle.

2. Description of the Prior Art

In recent years, the remarkable proliferation of automobiles has resulted in serious environmental problems. The exhaust gas from the great number of automobiles presents a serious social problem of enviromental pollution. Additionally, limited energy resources require automobiles to run efficiently.

With such a background, a recent effort in this field has been devoted to the development of automobiles equipped with electronic engine control system to electronically control the engine exhaust system, the engine ignition system, the engine intake system and the like for solving the above-mentioned problems.

Referring to FIG. 1, there is shown in block form the interconnection of the components of a conventional electronic engine control system, such an engine system, a computer for controlling the engine control system, an exhaust system for recycling exhaust gas and an output system for providing torque from the engine system. Fuel 12 is supplied to an engine system 11, together with a throttle position signal 13 for adjusting the amount of the fuel 12. The engine system 11 supplies a pressure signal 14 representing pressure in the engine system, a temperature signal 15, and an RPM signal 16 to the computer 17. Upon receipt of the various signals from the engine system, the computer 17 delivers a spark advance signal 18 to the engine 11 for determining when the engine is ignited on the basis of the signals from the engine system. Exhaust gas 19 is fed through path 20 to the engine system 11 and is recirculated through this path. The amount of the recirculating gas is adjusted by an exhaust gas recirculation valve (referred to as an EGR valve) 21. That is, the EGR valve 21 delivers an EGR valve position signal 22 to the computer 17. Responsive to this signal, the computer 23 delivers an EGR valve command signal 23 to the EGR valve 21 to control the EGR valve 21. Torque generated by the engine is transferred through a drive train 25 to cause vehicle motion.

The electronic engine control system as mentioned above has been described, for example, by R. H. Temple and S. S. Delin, Vehicle Control Dept., Ford Motor Co., Dearborn, Mich. U.S.A. in an article "The Use of Microprocessors as Automobile On-Board Controllers" in Microprocessor Applications in 1974 IEEE Intercon Technical Papers presented at the Institute of Electrical and Electronics Engineers International Convention and Expression, Mar. 26–29, 1974.

The block diagram of the automobile on-board controller is illustrated in FIG. 2.

As shown, this example employs a 12-bit word microprocessor for a central processing unit (CPU) 31. Analogue signals 32 from a vehicle are fed to the CPU 31, through a multiplexer/A-D converter 33. In the CPU 31, the control information is calculated on the basis of given algorithms stored in a read-only memory (ROM) 34. A spark system 35 and an EGR system 36 generate a spark timing control signal and an exhaust gas recirculation valve control signal.

The criteria in exhaust gas regulation have been more strict with the years. Further, there is a consistent demand to improve both the fuel consumption and the safety of vehicles. For this reason, the specification of the electronic engine control (EEC) system changes and is more strict year by year.

As a result more sophistcated automobile on-board controllers have been developed. One of them is an electronic engine control module (referred frequently to as an EEC system) 40 (FIG. 3) manufactured by Tokyo Shibaura Electric Co., Ltd. This system 40 executes fuel injection control in addition to spark timing control and exhaust gas recirculation valve control, through the automobile on-board computer 17. These controlled factors are controlled to be optimum for various conditions such as warming up, highland running, urban running, highway running, and maximum-powered running.

Turning now to FIG. 3, analogue input signals 41 derived from various kinds of sensors are delivered to a CPU 43, through a multiplexer/A-D converter 42. A speed signal and a position signal from the engine is transferred to the CPU 43, through a speed/position system 44. A corrected value stored in a read only memory (ROM) 45 is delivered to the CPU 43. The data are calculated on the basis of given algorithms through a microprogram stored in the ROM 45. The result of the calculation is transferred to an EGR control system 46, a fuel system 47 or a spark system 48 to execute the spark timing control, the exhaust gas recirculation control, and the fuel injection control.

Sensor signals inputted into the EEC system 40 and control signals for the sensor signals inputted have meanings as defined below.

In the sensor signals,

PWR (POWER) signal: signal for power supply from a main power supply.

CP+ (CRANK SHAFT POSITION): signal to indicate the crank shaft positions at the + side from a zero point.

CP− (CRANK SHAFT POSITION): signal to indicate the crank shaft positions at the − side from the zero point.

PCR (POWER CRANK): signal to indicate whether the engine is in starting condition or in running condition.

SIGRTN (SIGNAL RETURN): answer back sense signal for all the sensors.

CAT (CARBURETOR AIR TEMPERATURE): signal to indicate the temperature of air intaken into a carburetor.

BP (BAROMETRIC PRESSURE): signal to indicate ambient pressure at highland running.

TAP (THROTTLE ANGLE POSITION): signal to indicate the position of a throttle.

ECT (ENGINE COOLANT TEMPERATURE): signal to indicate the temperature of coolant.

EVP (EXHAUST GAS RECIRCULATION VALVE POSITION): signal to indicate the position of the exhaust gas recirculation valve position.

MAP (MANIFOLD ABSOLUTE PRESSURE): signal to indicate the pressure of a manifold.

AFR (AIR FUEL RATIO): signal to indicate the mixture ratio of fuel to air.

IAT (INTAKE AIR TEMPERATURE): signal to indicate the temperature of new charge in an intake manifold.

In the control signals,

SPOUT (SPARK OUT): signal to control the timing of spark.

VREF (REFERENCE VOLTAGE): signal to make signals with various levels for comparing them with an analogue signal.

SAD (SECONDARY AIR DUMP): signal for indicating whether the secondary exhaust gas control is conducted or not, that is to say, whether the primary exhaust gas is recirculated or not.

EGRP (EXHAUST GAS RECIRCULATION PRESSURE SOLENOID): output signal for the pressure solenoids of power devices such as a power window and a power brake.

CANP (CANNISTER PURGE): signal used in a solenoid system. For example, in a four cycle engine operating through four strokes, leakage gas between the cylinder and the piston in the compression stroke is not exploded in the explosion stroke. This signal is used to drive a solenoid for feeding again the leakage gas into the combustion chamber.

The algorithm and corrected value as mentioned above varies depending on the kind of car. For this, the EEC system in this example employs the ROM 45 of a module type in which a desired module of ROM may selectively be used in accordance with the kind of car used. In this specification, the read only memory will be referred to as a calibration assembly.

When such a control system is mounted on an automobile, new problems arise. One of them is how to check the perfectness of the function of the EEC system and how to simply and correctly trouble-shoot the system. This necessitates a tester to correctly diagnose the electronic engine control system in a simple manner.

SUMMARY OF THE INVENTION

Accordingly, an object of the invention is to present a tester for an electronic engine control system which can correctly check the perfectness of the function of an electronic engine control system in a simple manner.

To achieve the object of the invention, there is provided a tester for an electronic engine control system comprising: means for feeding signals to the electronic engine control system: means for inputting a signal from the electronic engine control system in response to the signals fed: means for judging the response signal inputted from the input means: means for outputting the result of the judgement by the judging means: and means for controlling the feeding means, the input means, the judging means, and the output means.

Other objects and features of the invention will be apparent from the following description taken in connection with the accompanying drawings, in which:

BRIEF DESCRIPTION OF THE DRAWINGS

FIGS. 5A and 5B show an exterior view of a tester for an electronic engine control system which is an embodiment according to the invention, in which FIG. 5A illustrates a front view of the tester and FIG. 5B a rear view of the same;

FIG. 6 shows a block diagram of an embodiment of a tester for the EEC system according to the invention;

FIG. 11 shows an exterior view of another embodiment of the tester according to the invention.

FIG. 12 shows a block diagram of the tester shown in FIG. 11;

FIG. 16 is a block diagram of the tester shown in FIG. 15;

FIG. 18 is a block diagram of a signal generator.

DETAILED DESCRIPTION OF THE PREFERRED EMBODIMENTS

Figure 1:
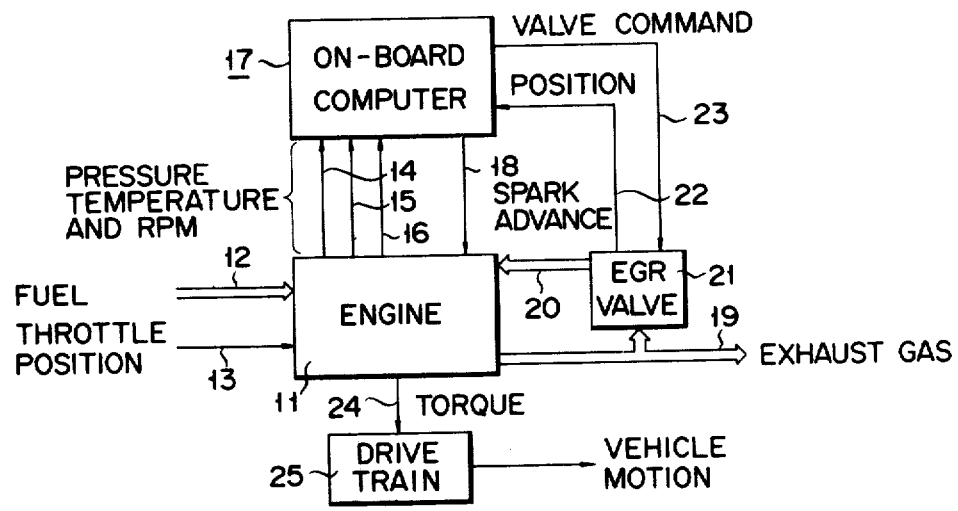
FIG. 1 shows an interconnection diagram of an example of conventional electronic engine control systems.
Figure 2:
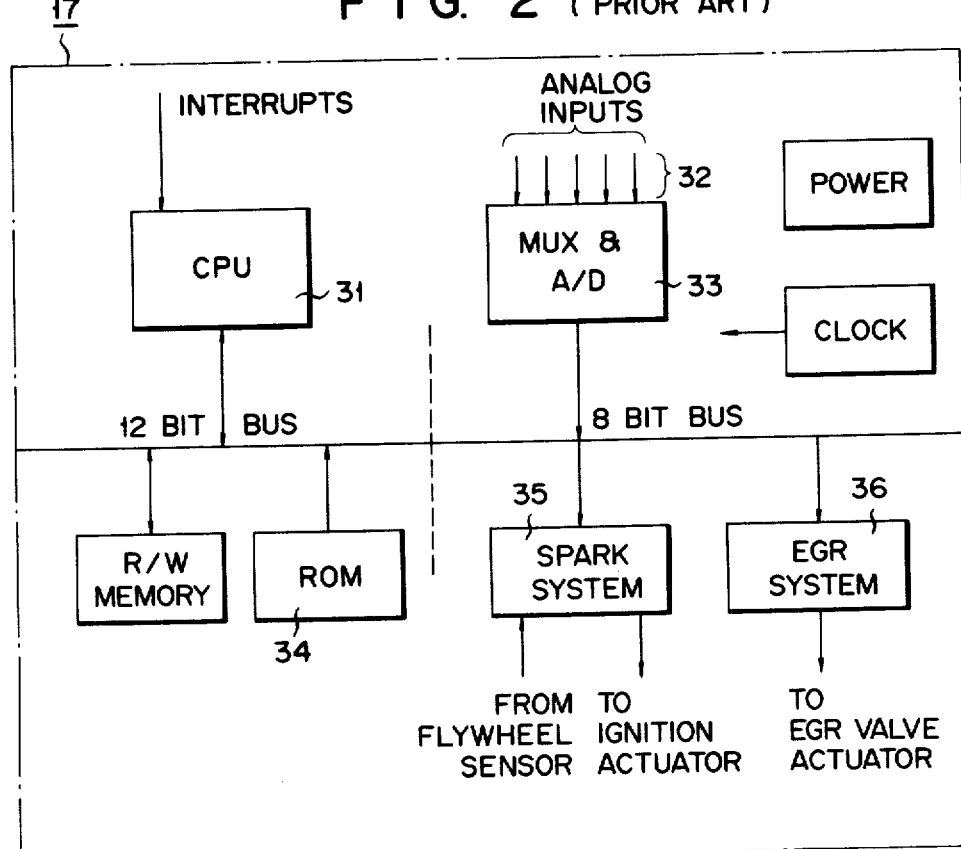
FIG. 2 shows a block diagram of an example of an onboard computer used in a conventional electronic engine control system.
Figure 3:
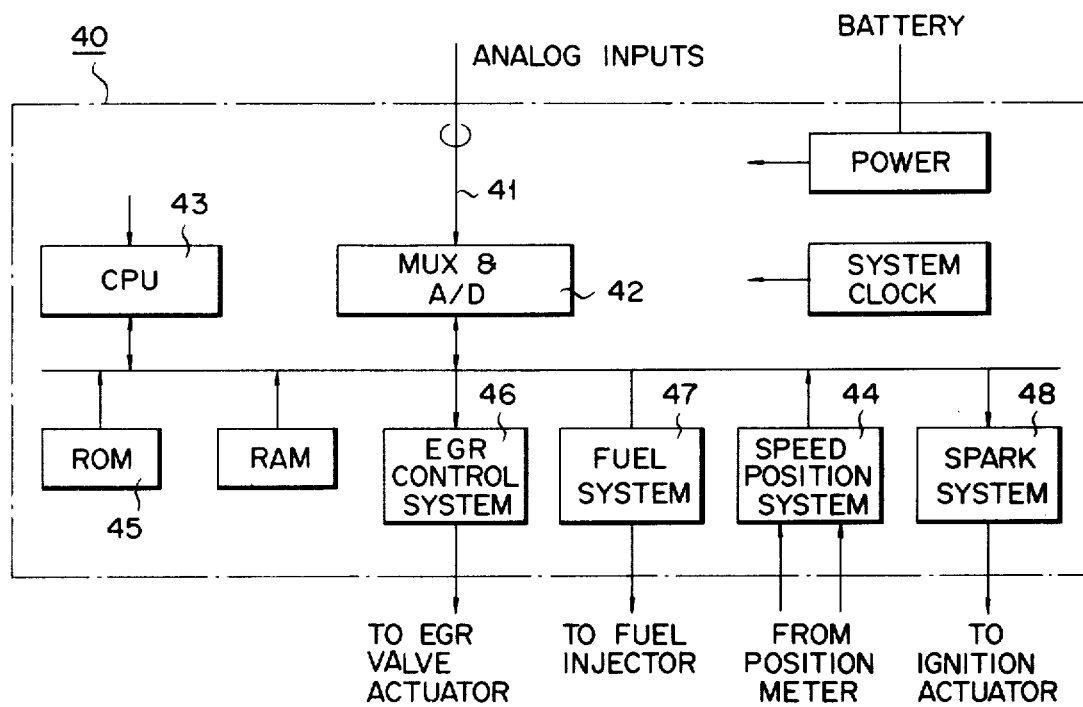
FIG. 3 shows a block diagram of another example of the on-board computer used in a conventional electronic control system.
Figure 4:
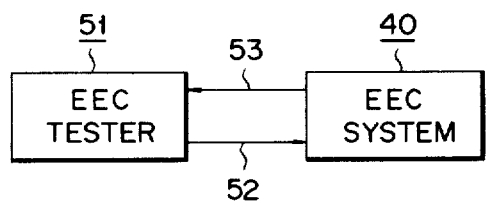
FIG. 4 illustrates the signal flows of basic signals transferred between a tester for an electronic engine control system and the electronic engine control system.

FIG. 4 illustrates a basic operation of an EEC tester 51. As shown, the EEC tester 51 generates sensor signals 52 which are in turn applied to an EEC system 40.

The sensor signals 52 are computed through a given algorithm specified depending on the kind of signal. As a result, the EEC system 40 produces control signals 53 which are then delivered as input information to the EEC tester 51. In the tester, the control signals are compared with the corresponding correct values previously stored in a proper portion in the EEC tester 51, so that it can be determined whether the interior logics in the EEC system 40 are working correctly or not.

An embodiment of the EEC tester 51 according to the invention will be elaborated with reference to FIGS. 5 to 10.

Figure 5A:
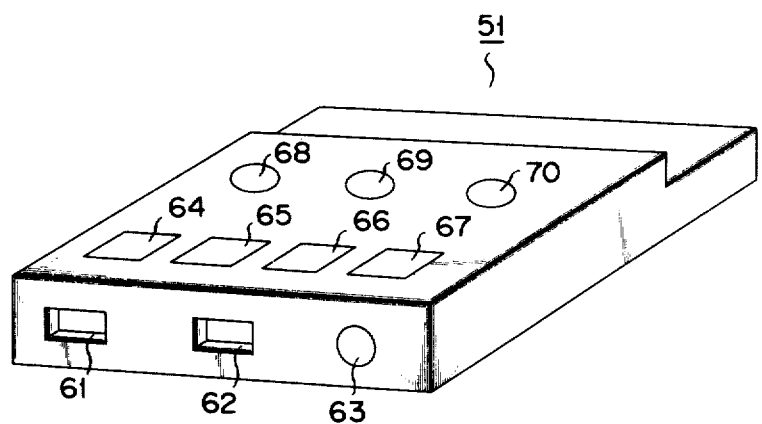

FIG. 5A shows a perspective view of an exterior view of the EEC tester. In the figure, a connector for a cable designated by reference numeral 61 is used for coupling a cable for supplying sensor signals to the EEC signal 40. A bus cable connector 62 is used to couple a bidirectional common bus used in the EEC system 40. A connector 63 is for a power source cable connected to a power source, for example, a vehicle battery (not shown). A "POWER" switch 64 controls the power supply from the power source to the EEC tester 51 and the EEC system 40. A "START" switch 65, when it is pushed, initiates the EEC tester 51. Reference numerals 66 and 67 designate a "ROM FULL TEST" switch 66 used to check the entire memory area of the ROM 45 to see if the contents of the memory are properly stored. The "ROM HALF TEST" switch 67 is used to check the memory area of the ROM 45 where a progra is stored to see if the contents thereof are properly stored. When the "POWER" switch 64 is turned on, a "POWER" lamp 68 lights up. When the result of the logic checking in the ROM 45 shows "normal", a "GO" lamp 69 lights up. When the result shows "abnormal", a "NO GO" lamp 70 lights.

Figure 5B:
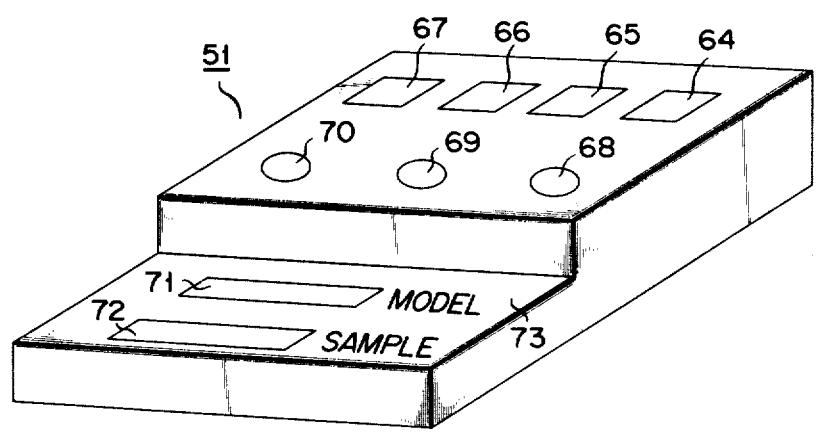

The rear side of the EEC system 40 is shown in FIG. 5B. At the rear of the system, a stepped portion 73 is formed where two connectors 71 and 72 are provided. The ROM 45, i.e. the calibration assembly, of the EEC system 40 is inserted into the connector 72. Inserted into the connector 71 is a reference calibration assembly for comparison with the ROM 45.

Referring now to FIG. 6, there is in block form the EEC tester 51 and the EEC system 40. In the figure, a block on the right side of the block enclosed by alternate long and short dash line, is an EEC system 40. As shown, the EEC system is comprised of a CPU 43, a random access memory 81 (referred to frequently as a RAM) used as a work area, an input control circuit 82 having the multiplexer/A-D converter 42 for processing the analogue and digital signals from the EEC tester 51, the speed position system 44, or the like, the EGR control system 46 for supplying the result of processing the information by the CPU 43, i.e. the control information, to the EEC tester 51, the fuel system 47 and the spark system 48. The CPU 43 and the RAM 81 are connected to each other through the bus cable 84. The output control circuit 83 is connected at the input terminal to the bus cable 84 and the input control circuit 82, at the output terminal to the same. Incidentally, the block enclosed by alternate long and short line and designated as 51 is the EEC tester 51. In FIG. 6, reference numeral 45 designates the ROM of the EEC system 40, i.e. the calibration assembly (the calibration assembly of the EEC system 40 will hereinafter be referred to as a sample calibration assembly). Reference numeral 85 designates a calibration assembly (hereinafter referred to as a reference calibration assembly) that serves as a reference for comparing the contents of the sample calibration assembly.

A standard ROM 86 stores common programs stored in the respective sample calibration assemblies for different kind of vehicles. The sample calibration assembly 45, the re-reference calibration assembly 85, and the standard ROM 86 are connected at the inputs to the output of an address generator 88, through a cable 87. The output terminal of the sample calibration assemby 45 is connected to the input terminal of a comparing circit 89. The output terminal of the reference calibration assembly 85 is connected to one of the input terminals of a select circuit 90 of which the other input terminal is connected to the output terminal of the standard ROM 86. The output terminal of the select circuit 90 is connected to the other input terminal of the comparing circuit 89. The output terminal of the comparing circuit 89 is connected to one of the input terminals of a display controller 91. The display controller 91 is connected at the other input terminals to the output terminal of a signal checking logics 92 serving as an input means and a judging means. The input means is comprised of, for example, an analogue signal input circuit and a digital signal input circuit. The analogue signal input circuits is comprised of, for example, a multiplexer and an analogue to digital converter, and the digital signal input circuit comprises a buffer resister, for example. The judging circuit is comprised of a circuit for judging the timing of a digital signal and a circuit for judging the threshold level of an analogue signal. The signal checking circuit 92 is connected at one of the input terminals to the EEC system 40 by means of a bus cable connector 62 shown in FIG. 5A.

In other words, the signal checking circuit 92 is connected through a bus cable 84 to the CPU 43 of the EEC system 40. The other input terminal of the signal checking circuit 92 is connected to the EEC system 40 by means of the signal cable connector 61 shown in FIG. 5A. That is, the signal checking circuit 92 is connected to the output terminal of the output control circuit 83 through the signal cable 93.

The signal output logics 94 is a signal supply means connected at the input terminal to the CPU 43 in the EEC system 40 through the bus cable 84, as in the case of the signal checking circuit 92. The output terminal of the signal output logic 94 is connected at the output terminal through the signal cable 93 to the input control circuit 82 in the EEC system 40. The respective output terminals of the display controller 91 are connected to a GO lamp 69 and a NO GO lamp 70, respectively.

The input terminals of the decoder 95 are connected to the ROM FULL TEST switch 66, the ROM HALF TEST switch 67, and the START switch 65. One of the output terminals of the decoder 95 is connected to the input terminal of the address generator 88 and the input terminal of the select circuit 90. The other output terminal of the decoder 95 is connected to the EEC system 40 through the bus cable 84. The power supply 96 is connected at the input terminal to the POWER switch 64 and at the output terminal to $V_{PWR}$ terminal 97, +5 V supply terminal 98, POWER lamp 68, and ±15 V supply terminal 99.

The ROM 100 is connected to the CPU 43 of the EEC system 40 through the bus cable 84. Unlike the standard ROM 86 storing the common part (program) in the respective calibration modules, a ROM 100 stores a control sequence for operating, comparing and judging the entire contents of the reference calibration assembly 85 and the same of the sample calibration assembly 45, or a sequence comparing the program part of the sample calibration assembly 45 and the program part of the standard ROM 86.

The operation of the EEC tester 51 thus constructed will be described.

A test will first be given of the sample calibration assembly 45.

The sample calibration assembly 45 to be tested is removed from the EEC system 40 and then connected with the connector 72 of the EEC tester 51. The same reference calibration assembly as the sample calibration assembly 45 is inserted into the connector 71 of the EEC tester 40. Then, the POWER switch 64 is depressed so that power is supplied to the EEC system 40 and the EEC tester 51. As a result, the power supply 96 is driven to produce the $V_{PWR}$ (battery power supply voltage) 97, $+5$ V 98 and $\pm 15$ V 99. And the POWER lamp lights up. Subsequently, the ROM FULL TEST switch 66 and then the START switch 65 are pressed. Upon pressing of these switches, the CPU 43 of the EEC system 40 operates to read out an instruction from the ROM 100 and to read out the contents at address 0 of the sample calibration assembly 45 on the basis of the instruction read out. The contents of the address 0 is then transferred to the comparator 89. Following this, the contents at address 0 of the reference calibration assembly 85 is read out and applied to the comparing circuit 89, through the select circuit 90. In the comparing circuit 89, the contents at the same address of both the assemblies are compared. When the contents of both are coincident, the addresses of them are incremented to each be address 1. The contents at the incremented addresses of both the assemblies are similarly compared. When the contents of both the assemblies are coincident over the entire addresses, the GO lamp 69 lights up. In this case, however, it is assumed that the contents of the respective addresses of the reference calibration assembly 85 have correct values. When the contents at the same addresses of them are different, the NO GO lamp 70 lights.

When there is no reference calibration assembly corresponding to the sample calibration assembly 45, the sample calibration assembly 45 is inserted into the connector 72 of the EEC tester 51. Then, the ROM HALF TEST switch 67 and the START switch 65 are pressed in this order. As a result, the starting address in the program area of the sample calibration assembly 45 is read out and then is applied to the comparing circuit 89. The contents at the starting address of the standard ROM 86 is applied to the comparing circuit 89 through the selector circuit 90. As in the case of the pressing of the ROM FULL TEST switch 66, when the contents selected to the sample calibration assembly 45 equal to that of the address selected of the standard ROM 86, these addresses are incremented and then the contents of the next addresses are compared.

When the contents of the sample calibration module 45 and the standard ROM 86 are coincident over every address in the program area, the GO lamp 69 lights up. In this case, it is assumed that the contents of the standard ROM 86 have correct values.

When the contents of the sample calibration assembly 45 coincident with that of the standard ROM 86, the NO GO lamp lights. The data of the sample calibration assembly are different for every kind of vechicles; however, the program is assumed to be common for the sample calibration assemblies of various kinds of automobiles.

Additionally, in the case of ROM HALF TEST as well as ROM FULL TEST, it is assumed that the EEC tester 51 uses the CPU 43 of the EEC system 40 and that the CPU 43 operates in correct manner.

When the CPU 43 has a fault, neither GO lamp 69 nor GO lamp 70 lights up.

The explanation to follow is the elaboration of CPU 43, RAM 81, input control circuit 82, output control circuit 83 and the like, except the calibration assembly 45 in the EEC system 40.

The ROM FULL TEST 61, the ROM HALF TEST switch 67 and the START switch 65 of the EEC tester 51 are turned on in this order.

Then, the CPU 43, the signal cable 93 and the bus cable 84 are tested by using the control program of the ROM 100.

The data with a bit pattern "AAA" (Hexadecimal is previously written into specified addresses of the ROM 100. Responsive to the control instruction of the ROM 100, the CPU 43 reads out from the same ROM the data with the "AAA" bit pattern and writes it into the RAM 81.

The CPU 43 reads the same data from the RAM 81 to compare it with the data read out from the ROM 100. In the comparing operation, if those are coincident, the GO lamp 69 lights up, while if those are not coincident, the NO GO lights up. In other words, the lighting of the GO lamp 69 indicates the CPU 43, the bus cable 84 and the signal cable 93 are in normal state. When the NO GO lamp lights, any one of those is in abnormal state, or defective.

In testing the RAM 81, the data with "AAA" (hexadecimal) are alternately loaded into every address of the RAM 81, for example. The data loaded are read out address by address from the RAM 81 and successively compared with the corresponding bit pattern "AAA" or "555" for checking whether the data are properly stored in the RAM 81 or not. When the loading data are coincident with the read-out data, the GO lamp 69 lights. When those are not coincident, the NO GO lamp 70 lights.

To test the perfectness of the EEC system 40 operation relating to analogue sense signals, analogue sense signals tabulated below are generated by the signal output logics 94 in the EEC tester 51 and then are subsequently applied to the input controller 82.

| Signal | Function |
|--------|----------|
| MAP | Manifold Absolute pressure sense signal |
| EVP | Exhaust gas recirculation valve position sense signal |
| AFR | Air fuel ratio sense signal |
| ECT | Engine coolant temperature sense signal |
| TAP | Throttle angle position sense signal |
| BP | Barometer pressure sense signal |
| IAT | Intake air temperature sense signal |

These analogue signals are converted into digital signals by an A-D converter and the digital signals converted are counted by the CPU 43. The counted values are compared with the optimum value previously stored in the ROM 100. The operation is performed relating to individual signals MAP, EVP, AFR, ECT, TAP, BP and IAT. With respect to all the analogue signals, when the counting value counted by the CPU 43 is equal to the value stored in the ROM 100, the GO lamp 69 lights up. When those are not coincident, the NO GO lamp 70 lights.

The signals in the solenoid system include a cannister purge (CANP) signal, a secondary air dump (SAD) signal, an exhaust gas recirculation pressure solenoid (EGRP) signal, an exhaust gas recirculation vent solenoid (EGRV) signal and the like. In checking these signals, these are changed from "LOW" to "HIGH" state, then to "LOW" state again, and finally to "HIGH" state. These signals are delivered to the signal checking logics 92 for judging. When these signals are "HIGH", the GO lamp lights. On the other hand, when these are "LOW", the NO GO lamp 70 lights up.

Figure 7:
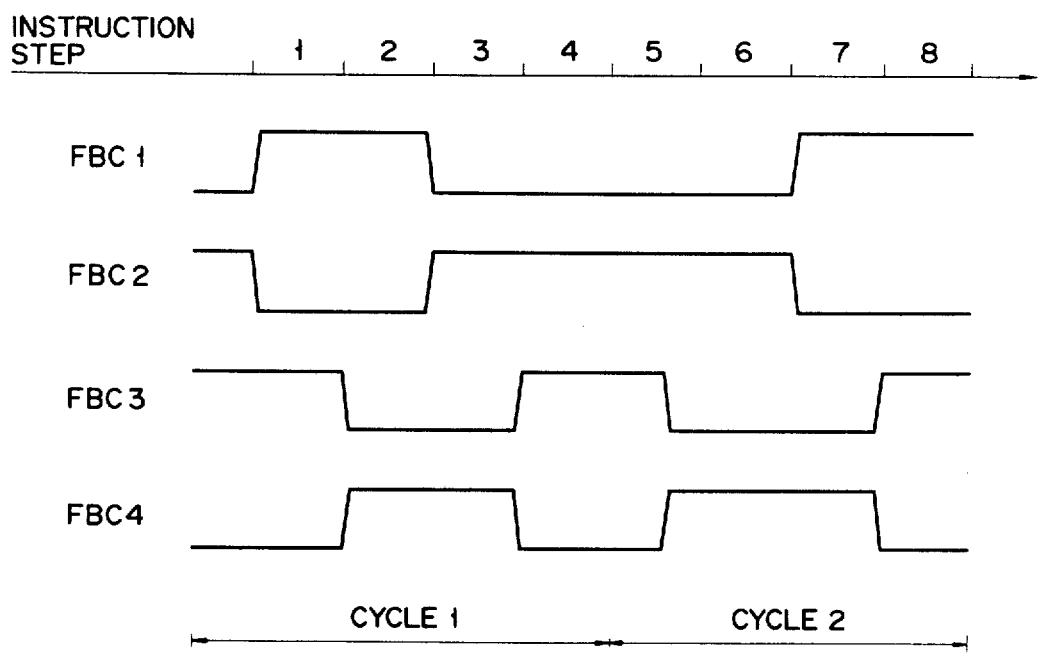
FIG. 7 shows a set of pulse waveforms of signals in a fuel system.

The explanation will be given about checking the signals in the fuel system. Responsive to the instruction from the CPU 43, these signals are checked as to whether pulses are generated or not in the sequence as shown in FIG. 7, responsive to the instruction of the CPU 43. In the figure, a signal FBC 1 is in "HIGH" state; a signal FBC 2 in "LOW" state; a signal FBC 3 in a "HIGH" state; a signal FBC 4 in a "LOW" state. In this case, the "HIGH" state is denoted as 1 and the "LOW" state as 0. With this notation, the states of the respective signals at the respective steps are indicated below.

| Step | FBC | FBC2 | FBC3 | FBC4 |
|---|---|---|---|---|
| 1 | 1 | 0 | 1 | 0 |
| 2 | 1 | 0 | 0 | 1 |
| 3 | 0 | 1 | 0 | 1 |
| 4 | 0 | 1 | 1 | 0 |
| 5 | 0 | 1 | 1 | 0 |
| 6 | 0 | 1 | 0 | 1 |
| 7 | 1 | 0 | 0 | 1 |
| 8 | 1 | 0 | 1 | 0 |

These values have previously been stored in the ROM 100. These signals stored are subsequently compared with those not stored in the order of FBC1, FBC2, FBC3 and FBC4. In the comparison, when there is equality found the GO lamp 69 lights. When there is found a difference therebetween, the NO GO lamp 70 lights up.

The explanation to follow is checking of the SPOUT signal.

First, the signal output logics 94 of the EEC tester 51 supplies a CPU signal through the signal cable 93 to the input controller 82. Check is made to see whether the EEC system 40 produces, in response to the CPU signal, the SPOUT signal after a given time. When the SPOUT signal is outputted as expected, the GO lamp 69 lights. On the other hand, when no SPOUT signaL is outputted, the NO GO lamp 70 lights.

The GO lamp 69 and NO GO lamp 70 are lit for every test. Accordingly, the final judgement of the EEC system 40 is conducted as follows:

In case the GO lamp 69 lights while the NO GO lamp does not light, all the parts tested are operating correctly. That is to say, no trouble is found in those parts. Therefore, the EEC system 40 is judged to be good.

On the other hand, when the GO lamp 69 does not light while the NO GO lamp 70 does light, this indicates that parts not operating correctly have been found. The EEC system 40 is judged to have a fault.

Additionally, when neither GO lamp nor NO GO lamp lights up, it is judged that the EEC tester 51 has a fault.

The EEC tester 51 will be described in more detail with reference to FIGS. 8 to 10.

Figure 8:
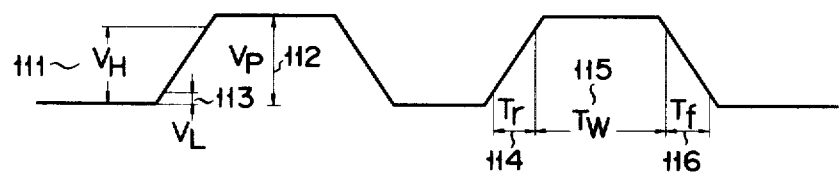
FIG. 8 shows a waveform of an input signal of the tester.

FIG. 8 shows a wave form of a signal imputted into the EEC tester 51. In the figure, the voltage $V_H$ 111 deemed to be at high level and a peak voltage Vp 112 are related by the following equation $$V_H = 0.9 \times V_p$$

A voltage $V_L$ 113 deemed to be at low level and the peak voltage Vp are related by the following equation $$V_L = 0.1 \times V_p$$

The wave form includes a rise time Tr 114, a time width Tw 115 and a fall time Tf 116.

Figure 9:
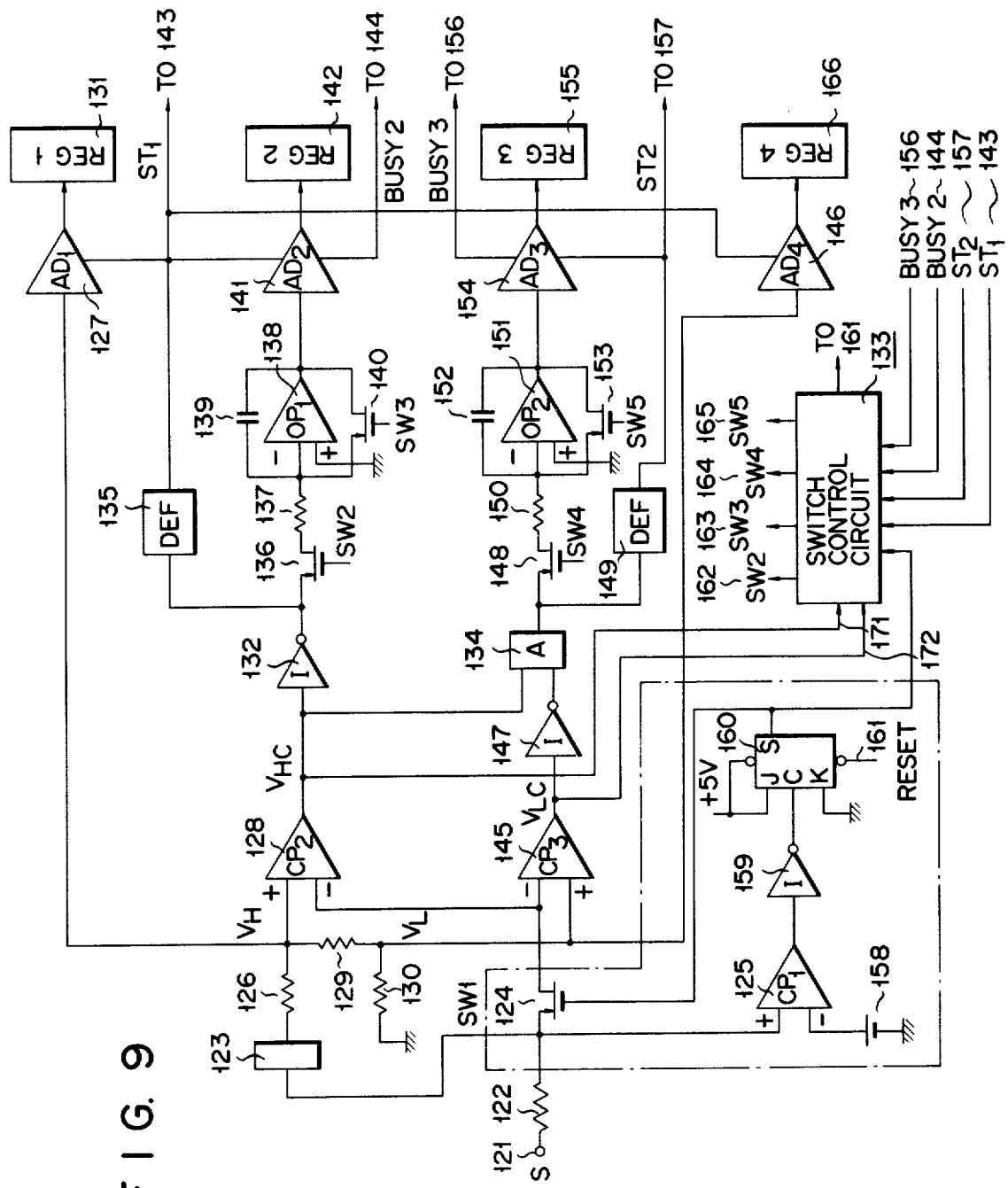
FIG. 9 shows a circuit diagram of signal checking logics used in the tester.
Figure 10:
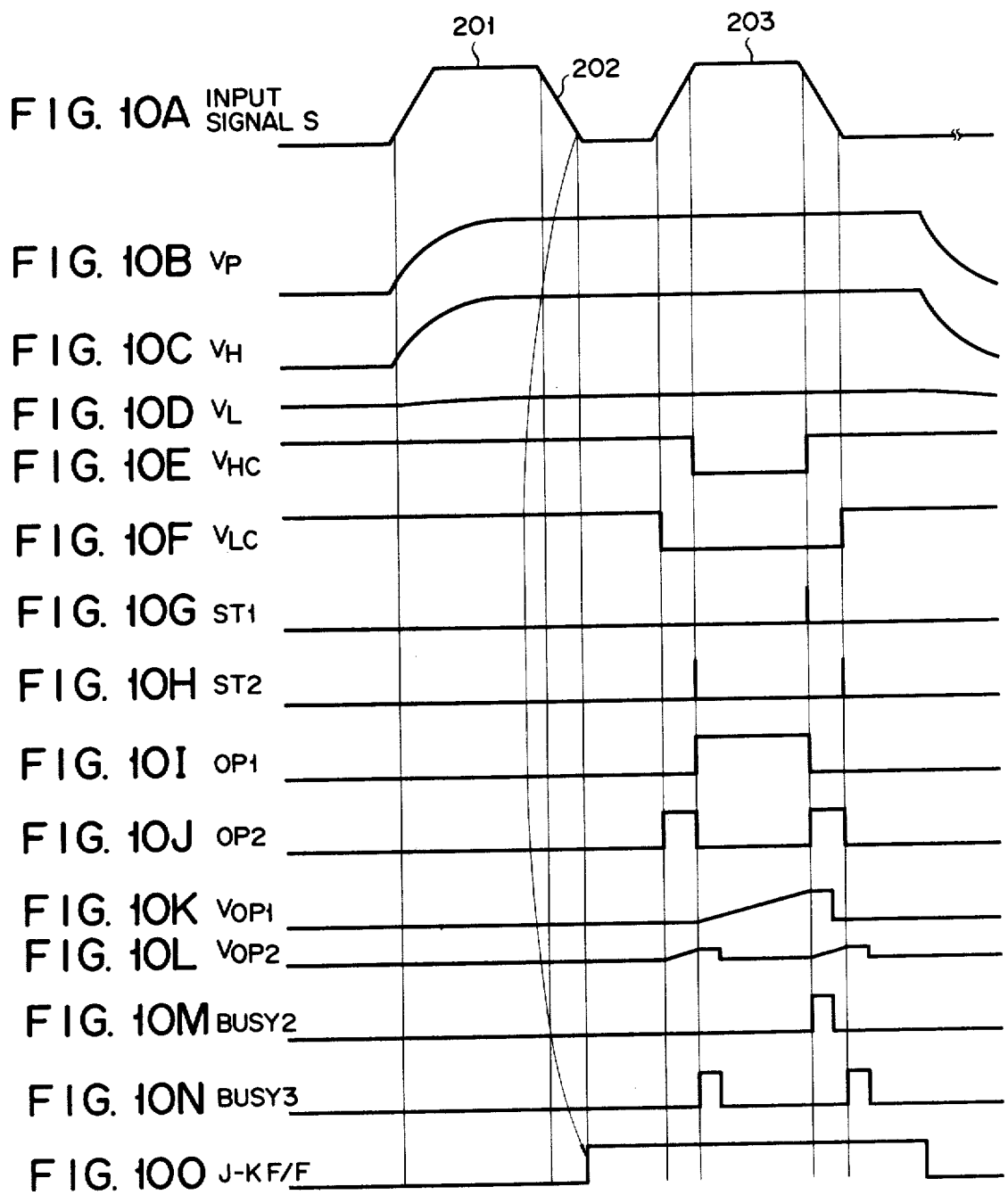
FIG. 10A is a waveform of an input signal to the signal checking logics.
FIG. 10B is a waveform of a peak voltage (Vp)
FIG. 10C is a waveform of a voltage $V_H$ representing a high level.
FIG. 10D is a waveform of a voltage $V_L$ representing a low level.
FIG. 10E is a waveform of an output voltage $V_{HC}$ of a comparator receiving the voltage $V_H$.
FIG. 10F is a waveform of an output voltage $V_{LC}$ of a comparator receiving the voltage $L_L$.
FIG. 10G is a waveform of a signal ST1 fed from a differential circuit when the voltage signal $V_{HC}$ is differentiated by the differential circuit.
FIG. 10H is a waveform of a signal ST2 fed from a differential circuit when the voltage signal $V_{LC}$ is differentiated by the differential circuit.
FIG. 10I is a waveform of a signal OP1 inputted to a first operational amplifier.
FIG. 10J is a waveform of a signal OP2 inputted to a second operational amplifier.
FIG. 10K is a waveform of a signal VOP1 outputted from the first operational amplifier.
FIG. 10L is a waveform of a signal VOP2 outputted from the second operational amplifier.
FIG. 10M is a waveform of a busy signal BUSY2 from first and second analogue to digital converter.
FIG. 10N is a waveform of a busy signal BUSY3 from third and fourth analogue to digital converters.
FIG. 10O is a waveform of an output signal from a J-K flip-flop.

FIG. 9 shows a circuit diagram of the signal checking logics 92 in the EEC tester 51. The signal with the wave form shown in FIG. 8 is applied to an input 121. The input terminal 121 is connected to the input terminal of a peak hold circuit 123, through a resistor 122, and to the source terminal of an FET 124 for switching and further to the negative input terminal of a comparator 125. The peak hold circuit 123 is provided with an input terminal (not shown) for receiving a reset signal to reset the peak hold circuit 123.

The peak hold circuit is connected at the output terminal through a first peak voltage dividing resistor 126 (this resistor produces the high level signal $V_H$) to an input terminal of a first analogue to digital converter 127 (referred to simply as an A-D converter), the positive input terminal of a comparator 128, the positive input terminal of the comparator 145, and to ground through second and third voltage dividing resistors 129 and 130 (these resistors produce the low level voltage $V_L$).

The output terminal of the first A-D converter 127 is connected to the output terminal of a first input buffer register 131. The voltage signal $V_H$ of high level shown in FIG. 8 is registered in the input buffer register 131.

The output terminal of the comparator 128 is connected to the input terminal of the inverter 132, to one of the input terminals of the switch control circuit 133, and further to one of the input terminals of an AND circuit 134.

The output terminal of the inverter 132 is connected to the input terminal of a differential circuit 135. The output terminal of the differential circuit 135 is connected to an input terminal 143 for a first start signal ST1 of the switch control circuit 133. The output terminal of the inverter 132 is connected to the source terminal of the FET 136 for the second switching. The drain terminal of the switching FET 136 is connected to the negative input terminal of a first operational amplifier 138, through an input resistor 137. The negative input terminal of the operational amplifier 138 is connected to the output terminal thereof through a capacitor 139. These components constitute an integration circuit. The negative input terminal is connected to the source terminal of a third switching FET 140. The drain terminal of the third switching FET 140 is connected to the output terminal of the operational amplifier 138. The positive input terminal of the amplifier 138 is grounded. The output terminal of the amplifier 138 is connected by way of a second A-D converter 141 to the input terminal of a second register 142. The second register 142 is used to register the time width Tw 45 of the waveform as shown in FIG. 8.

The output terminals of the first A-D converter 127 and the second A-D converter 141 are connected to an ST1 input terminal 143 of the switching control circuit 133. The other output terminal of the second A-D converter 141 is coupled with the input terminal 144 for a second busy signal BUSY 2 of the switching control circuit 133.

The drain terminal of the first switching FET 124 is connected to the second input teminal of a third comparator CP3 145 and the negative input terminal of the second comparator 128. The positive input terminal of the comparator 145 is coupled with the positive input terminal of the second comparator 128 through the voltage dividing resistor 129, and to the input terminal of a fourth A-D converter 146. The output terminal of the fourth A-D converter 146 is coupled with the input terminal of a fourth register 166. The output terminal of the third comparator CP3 is coupled by way of a second inverter 147 with the other input terminal of the AND circuit 134.

One of the output terminals of the AND gate 134 is connected to the source terminal of a fourth switching FET 148. The other output terminal of the AND circuit 134 is connected to the input terminal of the second differential circuit 149. The drain terminal of the fourth switching FET 148 is connected to the negative input terminal of a second operational amplifier 151 through a second input resistor 150. The negative input terminal thereof is connected through a capacitor 152 to the output terminal thereof. These components constitute another integration circuit. The negative input terminal of the amplifier 151 is coupled with the source terminal of a fifth switching FET SW5 153 of which the drain terminal is connected to the output terminal of the amplifier 151. The output terminal of the amplifier 151 is connected to the input terminal of a third A-D converter 154. The output terminal of the third A-D converter 154 is connected to the input terminal of a third register 155. The third register 155 registers the rise time Tr 114 and the fall time Tf 116 of the wave form shown in FIG. 8. One of the output terminals of the third A-D converter 154 is connected to a third busy signal BUSY 3 input terminal 156 of the switch controller 133. The other output terminal of the third A-D converter 154 is coupled with the output terminal of the second differential circuit 149 and to the second start signal ST2 input terminal of the switch controller 133.

The negative input terminal of the first comparator 125 is grounded through the power source 158. The output terminal of the first comparator 125 is connected to the first input terminal of a J-K flip-flop 160 via a third inverter 159.

The second input terminal of the flip-flop 160 is connected to a +5 V power source and the third input terminal thereof is earthed. A reset signal 161 is applied to the reset terminal of the flip-flop 160. The output terminal of the flip-flop 160 is connected to the input terminal of the switch controller 133 and to the gate terminal of the first switching FET 124. The output terminals of the second and third comparators 128 and 145 are coupled with the input terminals 171 and 172 of the switch control circuit 133, respectivley. The output terminals 162, 163, 164 and 165 of the switch control circuit 133 are connected to the second to fifth switching FET 136, 140, 148 and 153, respectively, while the other output terminals thereof are connected to the reset terminal 161 of the J-K flip-flop 160.

In FIG. 10A is illustrated a waveform of an input signal S to the signal checking logics 92.

In FIGS. 10B, 10C and 10D are illustrated the waveforms of the peak voltage Vp, the voltage $V_H$ of high level, and the voltage $V_L$ of low level. FIG. 10E and 10F illustrate the waveforms of output signals from the second and third comparators 128 and 145. FIG. 10G and 10H are waveforms of the first and second start signals ST1 and ST2. FIGS. 10I and 10J are the waveforms of output signals of the first and second operational amplifiers 138 and 151. FIGS. 10M and 10N are the waveforms of the busy signals BUSY 2 and BUSY 3. FIG. 10O shows the waveform of an output signal from the flip-flop 160.

An input signal S is applied to the input terminal 121 of the signal checking logics 92 of the EEC tester 51 thus constructed. The first pulse 201 of the input signal S drives the peak hold circuit 123. The peak value Vp as shown in FIG. 10B is held in the peak hold circuit 123. The peak value Vp held is then converted into the voltages $V_H$ and $V_L$ of high and low levels as shown in FIG. 10C and 10D through a combination of voltage dividing resisters 126, 129 and 130. These analogue voltages $V_H$ and $V_L$ are registered in the first and fourth registers 131 and 166, through the first and fourth analogue to digital converters 127 and 146, respectively. In other words, the signal $V_H$ is registered in the first register 131 and the signal $V_L$ in the fourth register 166. These voltage signals $V_H$ and $V_L$ are held in the peak hold circuit 123 until the test is completed.

At this time, the first switching FET 124 is kept in OFF condition and the second and third comparators 128 and 145 do not operate. The reason for this is to avoid such an occasion that, when the first pulse 201 is applied to the peak hold circuit 123, it is voltage-compared with the peak value Vp under an insufficient holding of the peak value Vp of the pulse 201. At the trailing 202 of the pulse 202, the first switching FET 124 is closed. As a result, the second and third comparators 128 and 145 operate and the J-K flip-flop 160 is set. The second pulse 203 inputted from the input terminal 121 is applied to the second and third comparators 128 and 145. Then, the second comparator 128 compares the voltage $V_H$ of high level with the voltage of the second pulse. In the third comparator 145, the voltage $V_L$ of low level is compared with the second pulse 203. Through these comparing operations, the comparators 128 produces at the output an output voltage with a waveform as shown in FIG. 10E and labeled $V_{HC}$, and the third comparator 145 produces an output signal with a waveform as shown in FIG. 10F and labeled $V_{LC}$. The signal $V_{HC}$ is applied to the first differential circuit 135 through the inverter 132. The differential circuit 135 differentiates the signal $V_{HC}$ to produce a start signal ST1 as shown in FIG. 10G.

The signal $V_{LC}$ is applied to the second differential circuit 149 through the inverter 147 and the AND circuit 134. The second differential circuit 149 produces a second start signal ST2, as in the case of $V_{HC}$. The signal $V_{HC}$ applied to the first differential circuit 135 passes through the second switching FET 136 and the input resister 137 to the first operational amplifier 138. The input signal OP1 at this time is illustrated in FIG. 10I.

The signal $V_{LC}$ applied to the second differential amplifier 149 goes through the fourth switching FET 148 and the input resister 150 to reach the second operational amplifier 151. The input signal OP1 at this time is shown in FIG. 10J.

These input signals OP1 and OP2 are applied to the first integrator including the first operational amplifier 138 and the capacitor 139, and the second integrator including the second operational amplifier 151 and the capacitor 152. Upon receipt of these signals, the first and second integrators produce output signals VOP1 and VOP2, respectively. These signals are shown in FIGS. 10K and 10L. The integrated signal VOP1 is applied to the second A-D converter 141 where it is converted into a digital form. The integrated signal is applied to the third A-D converter 154 where it is converted into a digital form.

During a period that the second and third A-D converters operate, these integrators are rendered conductive by the actions of the second and third FETs 136 and 140 and the fourth and fifth FETs 148 and 153, in order that the peak value of each pulse is held. These FET switched 136, 140, 148 and 153 are controlled by a switch control circuit 133. The signals VOP1 and VOP2 converted by the A-D converters 141 and 154 are loaded into the second and third registers 142 and 155, respectively. More specifically, registered in the second register 142 is the time width Tw 115. The third register 155 registers the rise time Tr 114 and the fall time Tf 116. The second and third A-D converters 141 and 154 produce at the output terminals the second and third busy signals BUSY2 and BUSY3 as shown in FIGS. 10M and 10N which are in turn applied to the input terminals for BUSY2 144 and BUSY3 156 of the switch control circuit 133.

The individual programs $V_H$, $V_L$, Tw, Tr and Tf registered in the first to fourth registers 131, 142, 155 and 166 are processed by a user program stored in the ROM 100. In this case, those parameters are related by the following equations $$Tr(Tf) = V_{HC} \cdot \overline{V}_{LC}$$

$$Tw = \overline{V}_{HC}$$

In this manner, the threshold levels and timing signals of measured signals are measured.

As described above, the EEC tester is so constructed as to automatically check the calibration assembly and the control signals by using the CPU. Therefore, it can find in a short time where a fault is, that is to say, the place the fault takes place is the EEC system or the mechanical system. Further, the result of the checking is simply indicated by only two lamps, the GO or NO GO lamp so that an ordinary layman, without an electrical knowledge, can easily operate the tester. The EEC tester may readily be connected by merely inserting the EEC unit and the cable into the connectors. This also enables a layman to handle the tester. Therefore, the checking by using the EEC tester may readily be conducted by ordinary drivers without the need for auto mechanics. The battery used in the automobile may be used for the power source of the EEC tester as mentioned above, thus eliminating the need for any special power source. Additionally, the CPU provided in the EEC unit is used for that of the EEC tester, thus leading to the reduction in weight, size and cost.

While the test conducted above relates to the calibration assembly of a single kind of car, it may be conducted upon the calibration assemblies for different kinds of cars if the reference calibration assemblies for the cars are used.

Turning now to FIG. 11, there is shown another embodiment of the EEC tester according to the invention. An EEC tester designated by reference numeral 301 in this example is mounted on a carrier 306 having casters 302 to 305, so as to easily be transferred. In the figure, the caster 305 is not seen although those casters are mounted at four bottom corners of the carrier 306. A GO lamp 307 and a NO GO lamp 308 are provided in the display section of the EEC tester 301. As in the previous case, the GO lamp 307 indicates the EEC system is normal and the NO GO lamp 308 indicates the system is not normal, i.e. goes wrong.

The EEC tester 301 is further provided with a power switch 309, a connector for sensor signal inputting 310, and a connector for control signal inputting 311.

FIG. 12 shows a block diagram of the EEC tester 301 shown in FIG. 11. As shown, the EEC tester 301 is provided with a CPU 312 of 16 bits, for example. The 16-bit CPU 312 is connected to a read only memory 314 via a memory bus 313, for example. The ROM 314 stores the contents of the calibration assemblies of many different cars. The ROM 314 further stores a test program for testing the EEC system 40 and a program to form a sensor signal supplied to the EEC system 40. The CPU 312 is connected to an input circuit 315 and an output circuit 316 which are both connected to the EEC system 40, through the signal cable connector 61. The CPU 312 connects via the I/O bus 330 to an EEC control memory ECM 317 connecting to the EEC system 40 via the bus cable 62. The ECM 317 corresponds to the sample calibration assembly shown in FIG. 6. A desired calibration assembly is loaded into the ECM 317 from the contents of the sample calibration assemblies for plural kinds of cars. The ECM 317 serves as a main memory. The CPU 312 connects to the GO lamp 307 and the NO GO lamp 308, through the I/O bus 330.

The explanation to be given is the operation of the EEC tester thus constructed.

A test program is read out from the ROM 314 and loaded into the ECM 317. The calibration assembly test is conducted in accordance with the sequence of the test program. That is, the contents of the sample calibration assembly is compared with that of the calibration assembly stored in the ROM 34. When the contents are coincident throughout the entire addresses in the comparing operation, the GO lamp lights up. The tests following this are conducted on the signals in the EEC system, i.e. analogue signals, digital signals, solenoid signals and the like.

As in the FIG. 6 embodiment, the sensor signals are read out from the ROM 314 and sent to the EEC system 40 via the output circuit 316. In the EEC system 40, the incoming sensor signals are compared, judged and processed by the CPU 43 included therein, and the control signals corresponding to the sensor signals are transmitted back to the CPU 312, through the input circuit 315. The CPU 312 measures the threshold level or the timing of the control signals delivered to diagnose the EEC system 40. As a result of the measurement, when there is found an abnormality in the control signal or signals, the NO GO lamp 308 lights up. On the other hand, when there is found no abnormality in the control signals, the GO lamp 307 lights.

Figure 13:
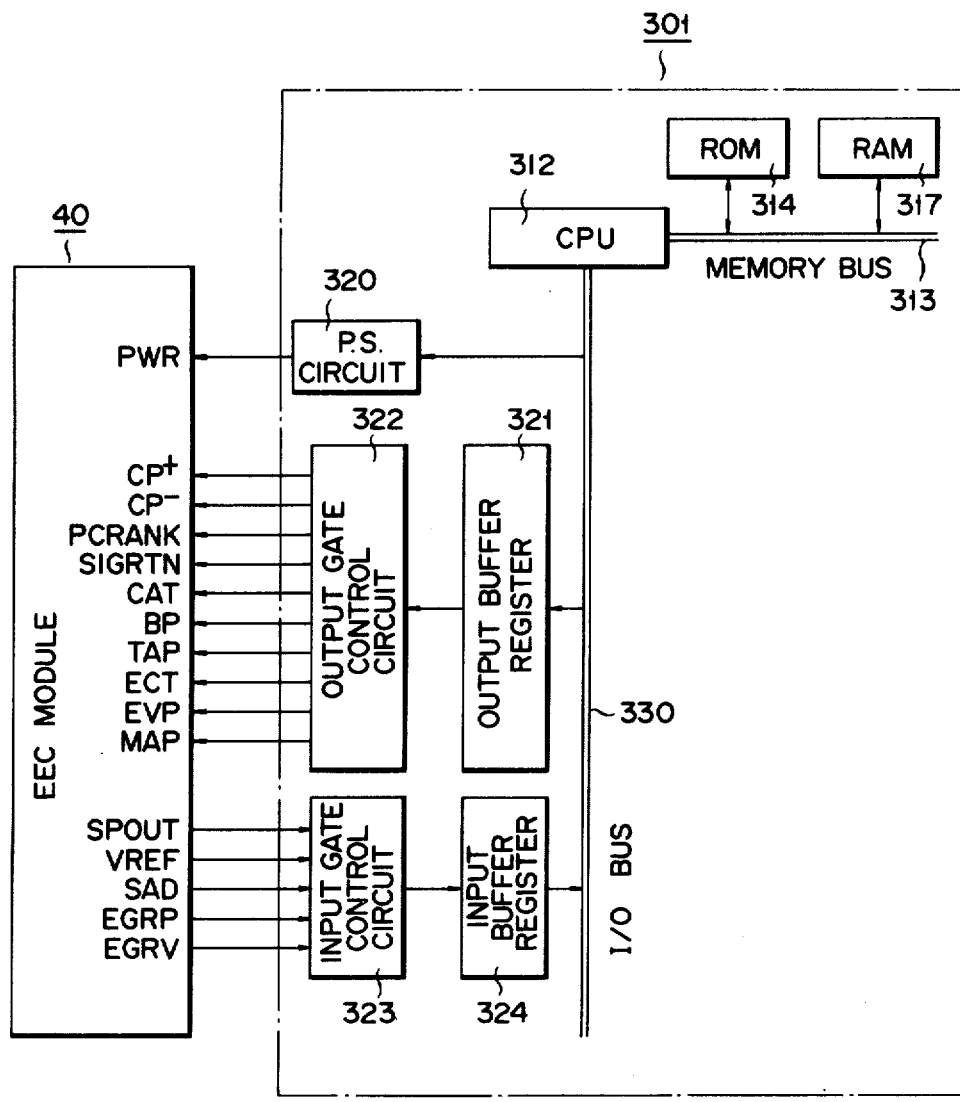
FIG. 13 shows a block diagram of an example of an input/output circuit in the tester for an electronic engine control system shown in FIG. 11.
Figure 14:
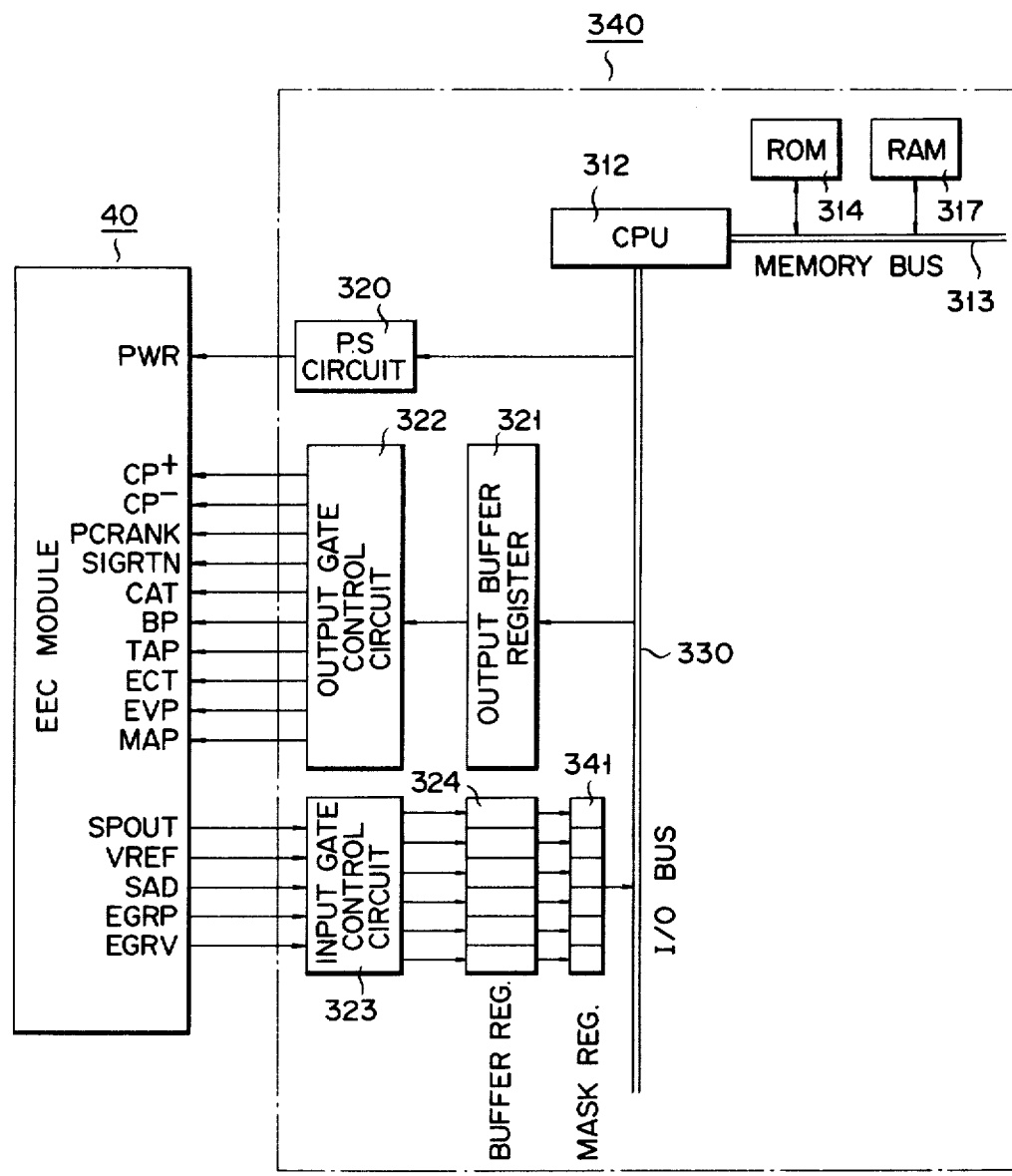
FIG. 14 is a block diagram of another example of the input/output circuit in the tester.

FIG. 13 which will now be described shows a block diagram of the EEC system 40 and the EEC tester 301. In this figure, the CPU 312 reads out the sensor signals from the ROM 314 and supplies them to the EEC system 40. In more particular, the EEC tester 301 supplies a PWR signal through the power supply circuit 320 to the EEC system 40. The digital sensor signals such as a CP+ signal, a CP− signal, a PCRANK signal, a SIGRTN signal and the like are supplied to the same through the output buffer register 321 and the output gate control circuit 322. The analogue signals such as a CAT signal, a BP signal, a TAP signal, an ECT signal, an EVP signal, and a MAP signal are supplied through the same to the EEC system 40. On the other hand, the EEC system 40 supplies to the CPU 312 the control signals such as a SPOUT signal, a VREF signal, a SAD signal, an EGRP signal, and an EGRV signal, through the input gate control circuit 323 and the input buffer register 324. The CPU 312 executes a diagnosis of the EEC system 40 by using these control signals. These control signals have been referred to in the FIG. 6 embodiment and therefore further explanation thereof will be omitted.

With such a construction and operation, the EEC tester discussed above can attain the similar useful effects of the FIG. 6 embodiment. Since the ROM 314 stores the contents of the calibration assemblies of all kinds of cars, the EEC tester of this example can test the EEC system for every kind of car.

The above-mentioned example is so designed that all the control signals from the EEC system 40 are inputted into the EEC tester 301. However, an alternate design may be employed in which a specified control signal alone is inputted into the CPU 312, through the input buffer resigeter 324 and a mask register 341. For example, in an auto repair shop, while a car having the on-board EEC system is being driven, a test can be conducted upon only a suspicious signal. The EEC tester in this example includes the CPU therein so that, if a proper peripheral device, for example, a printer, is connected through the I/O device 330 to the CPU 312, the result of the test may be printed on a paper as hard copy.

Figure 15:
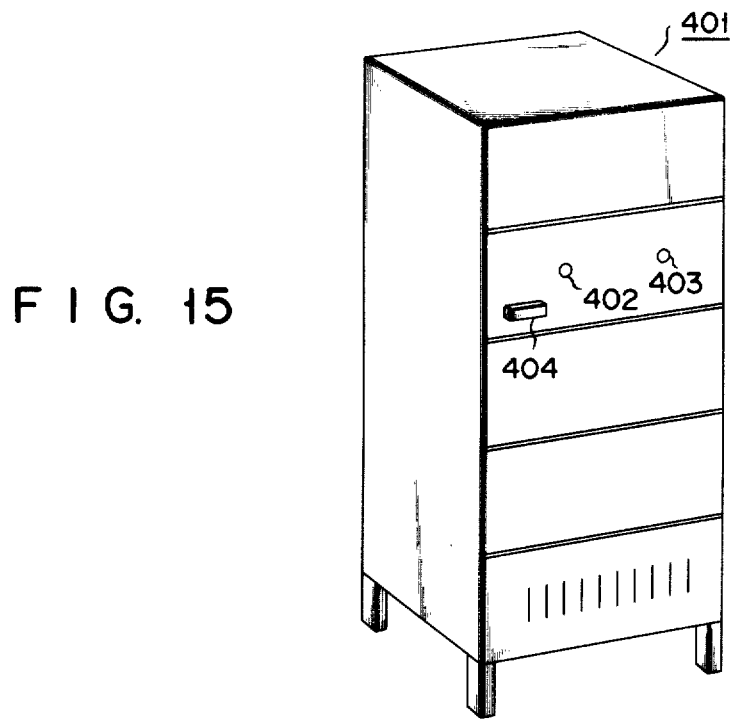
FIG. 15 shows an exterior view of still another embodiment of the tester according to the invention.

To illustrate still another embodiment of the invention, reference is now made to FIG. 15 showing an exterior appearance of an EEC tester used in an auto repair shop.

For the display section of the EEC tester 401, used are a GO lamp 402 and a NO GO lamp 403. The GO lamp 402 indicates, when lit, that the EEC system 40 goes well. The NO GO lamp 403 indicates, when lit, that the EEC system 40 has a fault. Reference numeral 404 designates a power switch.

Turning now to FIG. 16, there is shown an EEC tester 401. In the figure, a CPU shown at 405, which is a 16-bit minicomputer, is connected to a typer interface 407, through an I/O bus 406. The typer interface 407 is coupled with a typer 408 which is a printer for a journal. The CPU 405 is coupled through a floppy disc interface 409 to a floppy disc 410 storing a test program for the EEC tester 40 and the contents of calibration assemblies for every kind of car. Connected to the I/O bus 406 is a selector channel 411 further connecting to a memory bus 412 and a selector bus 413. The selector bus 413 connects to a magnetic disc 415 via a magnetic disk interface 414. In the magnetic disk 415 is stored test data for various EEC system and the information for displaying a report of the EEC system 40. The I/O cable 406 is also connected to the GO lamp 402 and the NO GO lamp 403 for indicating whether the EEC system is normal or not. The CPU 405 is coupled with an EEC module control memory (ECM), which is a random access memory. The contents of the calibration assembly of the EEC system 40 is read out from the floppy disk 410 and loaded into the ECM 416. The ECM 416 is connected to the bus of the EEC system 40 so that the EEC system 40 can use the ECM 416 as a main memory of the EEC system 40, i.e. the calibration assembly. The CPU 43 of the EEC system 40 may execute the control function of the EEC system 40 when reading out the instruction of the test program stored in the ECM 416 and executing it. A process I/O 417 connecting to the CPU 405 includes a measuring circuit such as a signal generator, an amplifier, and an A/D converter. The process I/O 417 conducts various tests for the EEC system 40. The process I/O 417 is provided with a protection circuit for protecting the EEC tester 401 from being damaged due to generation of an unusual voltage from the EEC system or erroneous operation of the EEC tester 401. A stamping machine coupled with the process I/O 417 is used to stamp a certificate of passing the test. Connected to the CPU 405 is a data link module 419 through which the EEC tester 401 is connected to a host processor, for example. Various data collected by the EEC tester 401 are transferred to the host processor in an inhouse on line mode where a daily report or a monthly report is prepared. Accordingly, the EEC system 40 may be tested by using a plurality of EEC testers 401. For example, the EEC testers respectively are provided in low, normal and high temperature lines and test data collected by these testers are transferred to the host processor where the test information in individual modules are collected to prepare necessary material. A main memory 421, which is connected to the CPU 405 through the memory bus 412, stores I/O handler programs for controlling various I/O devices such as the typer 408, floppy disc 410, process I/O 417 and data link module 419, or on-line or in-line program, from the magnetic disc and execute the programs.

Figure 17:
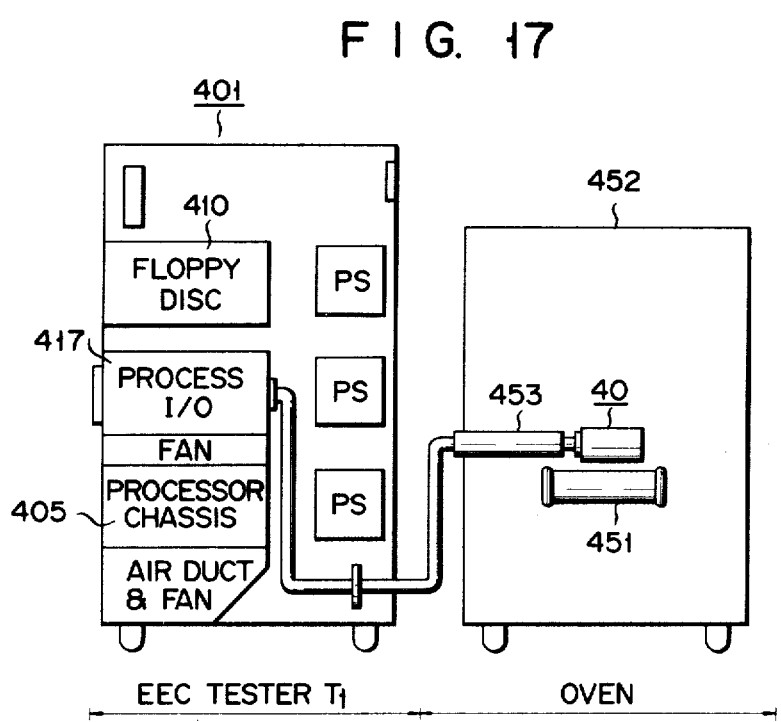
FIG. 17 shows a schematic view of an apparatus for testing testers manufactured in a factory.

Reference is now made to FIG. 17 illustrating in cross sectional view a case where the EEC tester 401 is in the production line for manufacturing the EEC system 40. As indicated in the figure, the EEC system 40 carried by a conveyer belt 451 is entered into a high and low temperature oven 452 and connected to the EEC tester 401 by a handler 453. Then, the following test is conducted of the EEC system 40. With respect to the DC characteristic of the EEC system 40, the power source voltage is measured through adjusting an input voltage of the EEC system 40. With respect to the AC characteristic, the peak to peak value is measured. The memory bus of the EEC system 40 is tested in a manner that all "0" and all "1" are loaded thereinto and then read out therefrom. In testing the output signals, tested are the SPOUT signal, EGRP signal, EGRV signal and the signals in the fuel system. The test of the fuel system signals is conducted of the rise time, time width, fall time and like. Furthermore, the voltage of the CP signal, the time interval of the clock signal, and the pulse width of the EGRV and EGRP signals are measured. Further tests are conducted of the threshold levels and timings of all the control signals, the logics of the memory and the bus lines, and the calibraion assembly of the EEC module. When the results of the tests show those are normal, the GO lamp 402 lights. When there is found an abnormality, the NO GO lamp 403 lights and the abnormal portion is recoded in the magnetic disc 415. The information recorded in the magnetic disc 415 are transferred to the host processor in an in-line mode, twice a day.

FIG. 18 which will now be described shows a signal generator 501 included in the processor I/O 417 of the EEC tester 401. The signal generator 501 generates a signal with the same waveform and timing as the sensor signal from the car to the EEC system 40.

In the figure, reference numerals 502 and 503 designate first and second programmable pulses of which the number is controlled by the CPU. The first programmable pulse 502 is applied to a pulse counter 504 where the number of the first programmable pulses are counted. The pulse number counted is used as an address to make an access to a peak value ROM 505. The peak value ROM 505 stores at the respective addresses the gain values corresponding to the pulse numbers. Accordingly, the gain value corresponding to the specified address is read out from the ROM 505 under control of the CPU 405. The gain value read out is inputted into a first D-A converter 506 where it is converted from digital to analogue form. The analogue value converted is applied to one of the input terminals of a multiplier 507.

Alternatively, upon the second programmable pulse 503 information, the waveform value corresponding to the second programmable pulse 50 is read out from the wave-form ROM 508 under control of the CPU 405. The waveform value read out is converted into analog form by the second D-A converter 509. The analogue value converted is applied to the other input terminal of the multiplier 507. The multiplier 507 superposes the gain on a specified waveform to gain a desired signal.

The EEC tester with such a construction may be installed in the production line of the EEC system 40 and tested by varying the conditions of the EEC systems. Further, since the result of the test about the EEC system is transferred to the host processor in in-line or on-line mode, it is convenient for preparing daily reports, weekly reports, monthly reports and the like. Additionally, the contents of the various calibration assemblies are stored in the floppy disc so that it is applicable for the tests of the EEC systems 40 of every kind of car.

Obviously many modifications and variations of the present invention are possible in the light of the above teachings. It is therefore to be understood that within the scope of the appended claims, the invention may be practiced otherwise than as specifically described.

What we claim is:

1. An apparatus for testing an electronic engine control unit wherein the electronic engine control unit receives input signals from a variety of sensors representing the physical conditions of an engine system and wherein the electronic engine control unit generates, in response to the received input signals, response signals to control the operation of the engine system, said testing apparatus comprising:

means for generating signals simulating physical conditions of an engine system;

means for selectively supplying said generated signals as said input signals to said electronic engine control unit;

means for receiving said response signals generated by said electronic engine control unit in response to said input signals supplied to said electronic engine control unit;

means for testing whether said received response signals are within predetermined response limits;

means for indicating the results of said testing determination; and means for controlling said generating means and said supply means to select the sequence of said simulating signals supplied to said electronic engine control unit and for controlling said receiving means, said testing means and said indicating means to control the indication of the result of the response of said electronic engine control unit to said supplied simulating signals.

2. The testing apparatus of claim 1 wherein said response signals generated by said electronic engine control unit comprise both analogue and digital signals.

3. The testing apparatus of claim 2 wherein said receiving means comprises an analogue signal input circuit and a digital signal input circuit.

4. The testing apparatus of claim 3 wherein said analogue signal input circuit comprises a multiplexer and an analogue-to-digital converter and said digital signal input circuit comprises a buffer register.

5. The testing apparatus of claim 4 wherein said buffer register produces digital outputs and wherein said testing apparatus further includes a mask register for selectively storing the outputs of said buffer register.

6. The testing apparatus of claim 2 wherein said testing means comprises a first circuit for testing the timing of said digital received response signals, a second circuit for testing the threshold level of said analog received response signal, and a circuit for testing the correctness of the predetermined response limits against which said received response signals are tested.

7. The testing apparatus of claim 1 wherein said indicating means comprises a first lamp for indicating that said received response signals are within said predetermined response limits and a second lamp for indicating that said received response signals are outside of said predetermined response limits.

8. The testing apparatus of claim 1 wherein said indicating means comprises a printer for printing the results of said test of said received response signals.

9. The testing apparatus of claim 1 wherein said indicating means comprises a first lamp indicating that said received response signals are within said predetermined response limits, a second lamp for indicating that said received response signals are outside of said predetermined response limits, and a printer for printing the result of said test of said received response signals on a printing medium.

10. The testing apparatus of claim 1 wherein said indicating means comprises a first lamp for indicating that said received response signals are within said predetermined response limits, a second lamp for indicating said received response signals are outside of said predetermined response limits, a printer for printing the results of said test of said received response signals, a magnetic disc unit for recording received response signals which are outside of said predetermined response limits, and data link means adapted to transfer said recorded response signals from said magnetic disc unit to a magnetic disc unit of another testing apparatus.

11. The testing apparatus of claim 1 wherein said control means comprises a central processor unit, input/output means for coupling said central processor unit to (1) said generating means, (2) said supplying means, (3) said receiving means, (4) said testing means, and (5) said indicating means, and a memory means operating as an external bulk memory for said central processor unit and as a main memory for said electronic engine control unit.

12. The testing apparatus of claim 1 wherein said controlling means comprises a central processor unit included in said electronic engine control unit.

13. The testing apparatus of claim 1 wherein said controlling means comprises:
- a first input/output bus;
- a central processor unit connected through said first input/output bus to said generating means, said supplying means, said receiving means, said testing means, and said indicating means;
- a second input/output bus; and
- a floppy disc memory unit connected through said second input/output bus to said central processor unit and adapted to store a program to control said central processor unit.

14. An apparatus for testing an electronic engine control unit wherein the electronic engine control unit includes (1) an input circuit for receiving input signals from a variety of sensors which represent the physical conditions of an engine system and (2) an output circuit for outputting response signals generated by said electronic engine control unit in response to said received input signal to control the operation of said engine system, said testing apparatus comprising:
- means for generating signals simulating the physical condition of an engine system and for selectively supplying said generated signals to said input circuit of said electronic engine control unit;
- means for receiving from said output circuit of said electronic engine control unit said response signals generated by said electronic engine control unit in response to said supplied simulating signals;
- first memory means for storing a testing sequence for controlling said generating and supplying means to selectively supply said simulating signals to said electronic engine control unit;
- second memory means for storing reference response signals corresponding to said simulating signals and representing acceptable responses to said corresponding simulating signals;
- means for comparing said received responses with said reference responses to determine whether said received responses are acceptable;
- and means for displaying the results of said comparison to thereby indicate whether said electronic engine control unit is properly responding to input signals simulating the physical conditions of an engine system.

15. The testing apparatus of claim 14 wherein said second memory means comprises a read only memory.

16. The testing apparatus of claim 15 wherein said read only memory is attachable and removable.

17. The testing apparatus of claim 14 wherein said displaying means comprises lamps for displaying the results of said comparisons.

18. The testing apparatus of claim 14 further including a power source supply circuit for supplying power to said testing apparatus, and further wherein said power source supply circuit is adapted to receive power from a battery of an automobile.

19. The testing apparatus of claim 14 wherein said comparing means comprises:
- a peak hold circuit for holding the peak value of said received response signal and for generating an output voltage;
- voltage dividing resistors for voltage-dividing said output voltage from said peak hold circuit into a high-level voltage and a low-level voltage;
- a first analogue-to-digital converter for converting said high-level voltage from analogue to digitial form;
- a first register for storing said digital output signal from said first analogue-to-digital converter;
- a first comparator for comparing said determined high level voltage with a said response signal and for generating an output signal;
- a first integration circuit for integrating the output signal of said first comparing circuit;
- a second analogue-to-digital converter for converting the analogue output signal of said first integration circuit to a second digital output signal;
- a second register for storing said second digital output signal;
- a second comparator for comparing said low-level voltage with a said received response signal;
- a second integration circuit for integrating the output signal of said second comparator;
- a third analogue-to-digital converter for converting the analogue output signal of said second integration circuit to a third digital output signal;
- a third register for storing said third digital output signal;
- a fourth analogue-to-digital convertor for producing a fourth digital output signal corresponding to said determined low-level voltage; and
- a fourth register for storing said fourth digital output signal.

20. An apparatus for testing an electronic engine control unit wherein the electronic engine control unit includes an input circuit for receiving input signals from a variety of sensors representing the physical conditions of an engine system and further wherein an output circuit provides response signals generated by said electronic engine control unit in response to said received input signals to control the operation of said engine system, said testing apparatus comprising:
- a signal-delivering circuit connected to said input circuit of said electronic engine control unit for generating and for supplying simulated sensor signals to said electronic engine control units;
- a receiving circuit coupled to said output circuit of said electronic engine control unit for receiving said response signals generated by said electronic engine control unit;
- an input/output bus coupled to said signal-delivering circuit and to said receiving circuit;
- a central processor unit connected to said input/output bus for receiving said response signals from said receiving circuit over said bus and for testing said received response signals against corresponding reference response signals to determine whether said received response signals are acceptable or not acceptable;
- a memory bus coupled to said central processor unit;
- a memory connected to said memory bus for storing a program to control said central processor unit and the testing of said response signals received from said electronic engine control unit; and
- a display circuit for displaying the results of said test performed by said central processor unit.

21. The testing apparatus of claim 20 wherein said memory is adapted to store a plurality of reference response signals for comparison with response signals generated by a corresponding plurality of electronic engine control units.

22. The testing apparatus of claim 20 wherein said display circuit comprises a first lamp for indicating that said received response signals are acceptable and a second lamp for indicating that said received response signals are unacceptable whereby the electronic engine control unit that generated said received response signals is indicated to be operating acceptably or unacceptably.

23. The testing apparatus of claim 20 wherein said signal-delivering circuit comprises:
   programable means for generating a first digital pulse train and a second digital pulse train;
   a first memory for storing peak value signals in digital form at addressable memory locations;
   a pulse counter for counting said pulses in said first digital pulse train and for addressing said first memory according to the count in said pulse counter to output from said first memory a said stored digital peak value;
   first digital-to-analogue converter means for converting to analog form said digital peak value signal outputted from said first memory;
   a second memory for storing digital waveform values and for outputting a said stored digital waveform value in response to the digital pulses in said second digital pulse train;
   a second digital-to-analog converter for converting said outputted digital waveform to an analog signal; and
   a multiplier for multiplying the output of said first digital-to-analog converter by the output of said second digital-to-analog converter.

24. An apparatus for testing a sample calibration assembly used to control the operation of an electronic engine control unit wherein the electronic engine control unit comprises (1) an input control circuit receiving input signals from a plurality of sensors representing the physical conditions of an engine system, (2) means for generating response signals for controlling the operation of the engine system in response to said received input signals and (3) a circuit for outputting the generated response signals, and wherein the sample calibration assembly comprises a first memory means for storing a sequence of instructions to control said generating means and said electronic engine control unit, said testing apparatus comprising:
   a reference calibration assembly comprising a second memory means for storing a reference sequence of instructions for controlling said generating means, said reference sequence of instructions corresponding to said sequence of instructions stored in said first memory means of said sample calibration assembly;
   means for selectively addressing said sequence of instructions stored in said first memory means and said corresponding sequence of instructions stored in said second memory means;
   means for comparing an addressed instruction from said sequence of instructions stored in said first memory means to its corresponding instruction in said reference sequence of instructions, and for generating an output signal indicating whether said compared instructions are equal or unequal;
   means for transferring an addressed instruction in said sequence of instructions stored in said first memory means to said comparing means and an addressed instruction in said reference sequence of instructions stored in said second memory means to said comparing means for comparison thereby; and
   means receiving said generated output signal from said comparing means and for indicating whether said compared instructions are equal or unequal.

25. The testing apparatus of claim 24 further including means for controlling said addressing means to sequentially address said instructions stored in said first memory means and to selectively address a corresponding instruction in said sequence of reference instructions stored in said second memory means.

26. The testing apparatus of claim 25 wherein said receiving and indicating means comprises a first lamp for indicating said compared instructions are equal, a second lamp for indicating said compared instructions are unequal, and means for selectively actuating said first lamp or said second lamp in response to said output signal which represents that said compared instructions are equal or unequal, respectively.

* * * * *